United States Patent [19]

Koerner

[11] Patent Number: 4,876,546
[45] Date of Patent: Oct. 24, 1989

[54] DOPPLER SHIFT GENERATOR APPARATUS

[75] Inventor: Charles B. Koerner, Port Murray, N.J.

[73] Assignee: ITT Corporation, New York, N.Y.

[21] Appl. No.: 255,938

[22] Filed: Oct. 11, 1988

[51] Int. Cl.$^4$ .............................................. G01S 7/38
[52] U.S. Cl. ........................................ 342/15; 342/200
[58] Field of Search ............................ 342/15, 14, 200

[56] References Cited

U.S. PATENT DOCUMENTS

| 3,891,989 | 6/1975 | Barney et al. | 342/15 |
| 3,971,021 | 7/1976 | Cann | 342/15 |
| 4,072,949 | 2/1978 | Van Brunt | 342/15 |
| 4,100,957 | 7/1979 | Jesinger | 342/15 |
| 4,297,641 | 10/1981 | Sterzer | 342/14 |
| 4,338,528 | 7/1982 | Wolkstein | 342/14 |
| 4,505,264 | 3/1985 | Bogert et al. | 342/15 |
| 4,683,473 | 7/1987 | Haugland | 342/15 |

Primary Examiner—Thomas H. Tarcza
Assistant Examiner—Mark Hellner
Attorney, Agent, or Firm—Thomas N. Twomey; Mary C. Werner

[57] ABSTRACT

Doppler shift generator for use in electronic countermeasures equipment includes analog memory devices which are comprised of acoustic charge transport (ACT) memory devices. Such Doppler shift generators includes a switch which alternately applies an input signal to said first and second analog memory devices. Each analog memory device is responsive to a clock signal to sample data at a first frequency and to output the data at a second frequency. As a result, a Doppler shifted signal is generated whose frequency has been shifted by the difference in the first and second frequencies.

20 Claims, 4 Drawing Sheets

DOPPLER SHIFT GENERATOR APPARATUS

TECHNICAL FIELD OF THE INVENTION

The present invention pertains to apparatus for use in electronic countermeasure (ECM) equipment and, in particular, to Doppler shift generators for use in electronic countermeasure equipment.

BACKGROUND OF THE INVENTION

It is well known in the art that there is a need for electronic countermeasure (ECM) equipment to counter a Doppler type tracking radar. Doppler radars are widely employed as discrimination between stationary and moving targets is possible by the use of the Doppler principle. Doppler radar systems have been employed which are either continuous or pulsed Doppler radar systems. In its simplest application a CW transmitter is used and the return energy is detected by mixing it with a portion of the transmitted power. Fixed targets produce a constant voltage whereas a moving target produces an alternating voltage at the Doppler frequency difference between the transmit and receive signals. This Doppler frequency is extremely well known. Each cycle of Doppler frequency normally corresponds to a target radial motion of one half of the transmitted wavelength. Thus, a target moving with a radial velocity of 300 miles per hour or 444 feet per second will move about 880 half waves per second at 1,000 mHz resulting in a Doppler frequency of about 880 Hz. As indicated, Doppler radar systems are widely employed. Such Doppler systems can be utilized to track a target and hence to provide a display indicative of the target's path. The signals from the radar can be used for weapon control, and hence countermeasures are needed to confuse the tracking radar or to jam the radar. Specifically, in countering such Doppler type tracking radars, it is well known that there is a need for a Doppler shift generator apparatus to provide velocity deception. Certain presently developed Doppler shift generators use a repeater which utilizes a frequency translation or serrodyne apparatus. The use of such repeaters in electronic countermeasure equipment for countering Doppler type tracking radars is difficult based on the fact that Doppler radars have a high degree of frequency accuracy and measurement resolution. Hence, the use of signal generation from a repeater or ECM device which attempts to set an RF oscillator onto precisely the same frequency as the signal received from such radars, or onto a frequency which is close thereto is extremely difficult.

It is well known to those of ordinary skill in the art that electronic countermeasure (ECM) equipment which can delay a received signal in time for the purpose of range falsification and which can shift the frequency of the received signal for the purpose of velocity deception requires some sort of signal storage. RF memory devices that have been used in the past to satisfy this need include digital RF memory devices (DRFM) and analog RF memory devices (ARFM). For example, a typical ARFM is comprised of a high gain traveling wave tube (TWT) and delayed feedback to provide serrodyne, or frequency translation by mixing. However, these RF memory devices suffer from several drawbacks, such as, low reliability, high noise, large size, large weight, spurious and harmonically related RF output signals, and narrow RF bandwidth. Specifically, DRFM suffer from large size and low performance because of the need to perform multiple analog-to-digital conversions which are followed by digital-to-analog conversions. Such conversions lead to spurious spectral contributions, poor phase coherence, and bandlimited operation. Further, specifically, ARFM using traveling wave tubes (TWT) type analog memory loops and serrodyne translation are very noisy, lack phase coherence and generate many spurious signals. Further, ARFM suffer from the additional disadvantage that long term storage of the received signal is not possible. As a result, ARFM does not permit one to fabricate electronic countermeasure equipment that can selectively delay a transmitted signal for the purpose of completely covering a received radar pulse that is reflected from the countermeasure platform being protected and for the purpose of generating false range targets.

As a result, there is a need in the art for a Doppler shift generator for use in electronic countermeasure equipment which is smaller in size, higher in performance, has fewer spurious spectral contributions, better phase coherence, and a wider band of operation than existing apparatus fabricated using DRFM or ARFM. Further, there is a need for such apparatus which can provide long term storage of the received signal so that electronic countermeasure equipment can selectively delay a transmitted radar signal with respect to a received signal for the purpose of completely covering a received radar pulse that is reflected from the countermeasure platform being protected and for the purpose of generating false range targets.

SUMMARY OF THE INVENTION

Embodiments of the present invention advantageously solve the above-identified problems in the art by providing a Doppler shift generator for use in electronic countermeasure equipment which is comprised of analog memory devices such as acoustic charge transport (ACT) analog memories. These ACT memories are structured to employ a surface acoustic wave (SAW) which operates in conjunction with charge transport to sample, store and process RF input signals with wide bandwidth and large dynamic range. The use of ACT memories in accordance with the present invention provides a Doppler shift generator which is smaller in size, higher in performance, has fewer spurious spectral contributions, better phase coherence, and wider band of operation than existing apparatus fabricated using DRFM or ARFM. Further, the use of ACT memories in accordance with the present invention provides a Doppler shift generator which can provide long term storage of the received signal so that the electronic countermeasure equipment can selectively delay the transmitted signal with respect to the received signal for the purpose of completely covering the radar pulse reflected off the countermeasure platform being protected and for the purpose of generating false range targets.

In particular, a Doppler shift generator fabricated in accordance with the present invention comprises a control means for generating: (1) first and second memory control signals which are applied as input to first and second analog memory devices, respectively; (2) first and second clock control signals which are applied as input to first and second clock means, respectively, and (3) first and second switch control signals which are applied as input to first and second switch means, respectively. In operation: (1) the first switch means, in response to the first switch control signal, alternatively applies an input signal to the first and second analog memory devices; (2) the first clock means, in response to the first clock control signal, outputs a first clock signal having a first frequency and a second frequency which is applied to the first analog memory device; (3) the second clock means, in response to the second clock control signal, outputs a second clock signal having a first frequency and a second frequency which is applied to the second analog memory device; (4) the first analog memory means, in response to the input signal, the first clock signal, and the first analog memory control signal, samples the input at the first frequency, stores the samples for a time, and outputs the samples at the second frequency as a first signal to the second switch means; (5) the second analog memory means, in response to the input signal, the second clock signal, and the second analog memory control signal, samples the input at the first frequency, stores the samples for the time, and outputs the samples at the second frequency as a second signal to the second switch means; and the second switch means, responsive to the first and second signals and the second switch control signal, alternatively outputs the first and second signals as a Doppler shifted output signal. Further, in accordance with preferred embodiments of the present invention, the first and second analog memory devices are comprised of acoustic charge transport (ACT) memory devices.

Further, as will be explained in detail below, embodiments of the present invention can operate either in a "chop" mode wherein reception and transmission alternate or in a simultaneous "transmit/receive" (T/R) mode.

Still further, embodiments of the present invention wherein the analog memory devices are comprised of ACT memory devices can be used to provide Doppler shifted outputs for the full microwave bandwidth by utilizing multiple phase sampling apparatus.

BRIEF DESCRIPTION OF THE DRAWING

A complete understanding of the present invention may be gained by considering the following detailed description in conjunction with the accompanying drawing in which.

To facilitate understanding, identical reference numerals have been used to denote identical elements common to the figures.

DETAILED DESCRIPTION

Figure 1:
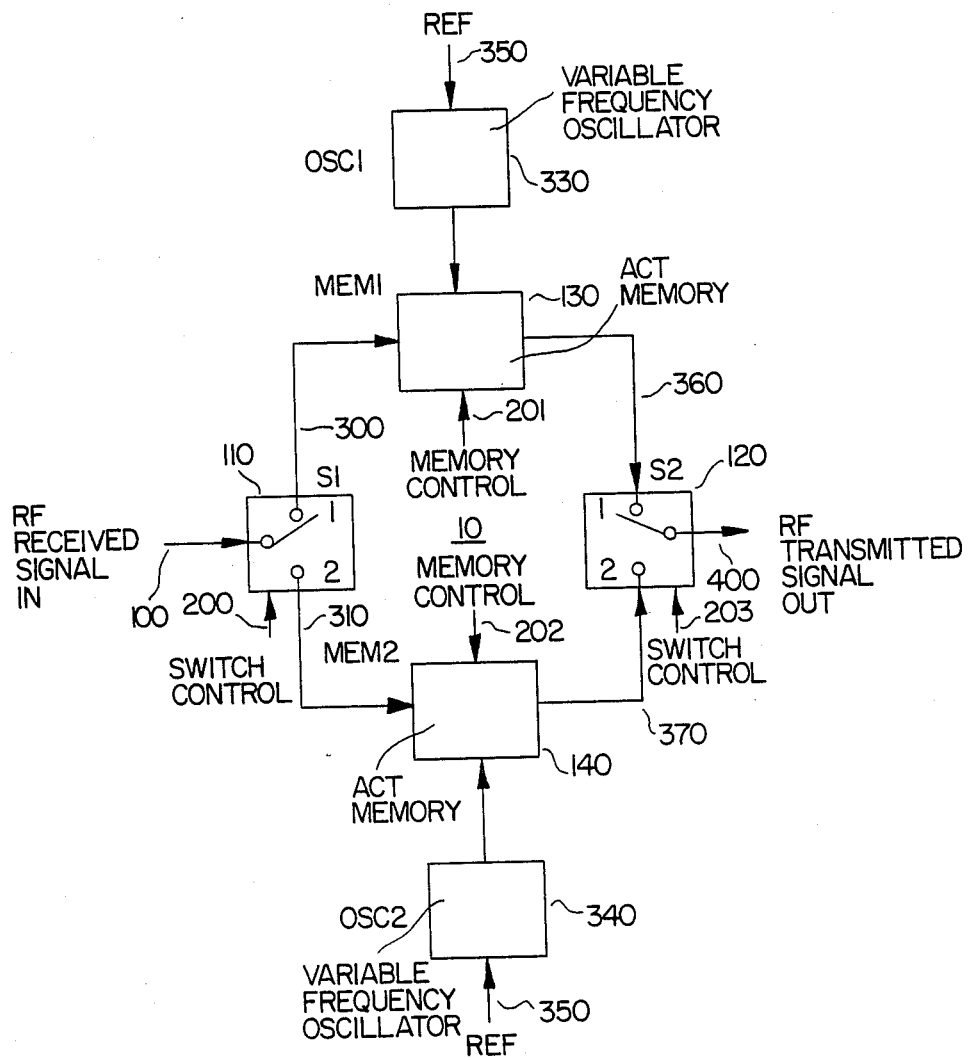
FIG. 1 shows a block diagram of the inventive doppler shift generator.
Figure 3:
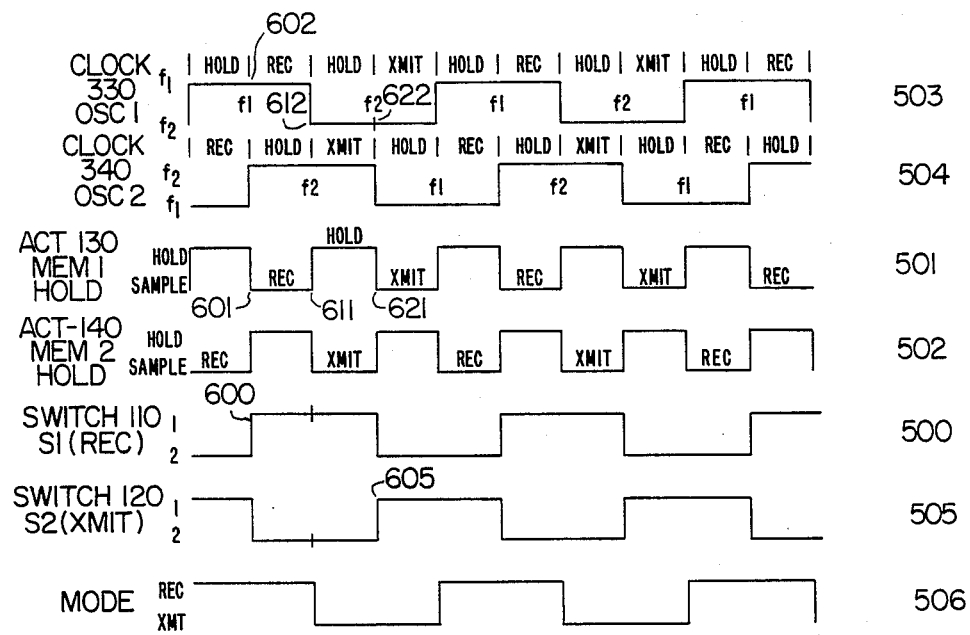
FIG. 3, shows, in pictorial form, a timing diagram of various signals which illustrates the operation of the inventive Doppler shift generator shown in FIG. 1 in the "chop" mode; and, FIG. 4, shows, in pictorial form, a timing diagram of various signals which illustrates the operation of the inventive Doppler shift generator shown in FIG. 1 in the simultaneous "transmit/receive" mode.
Figure 4:
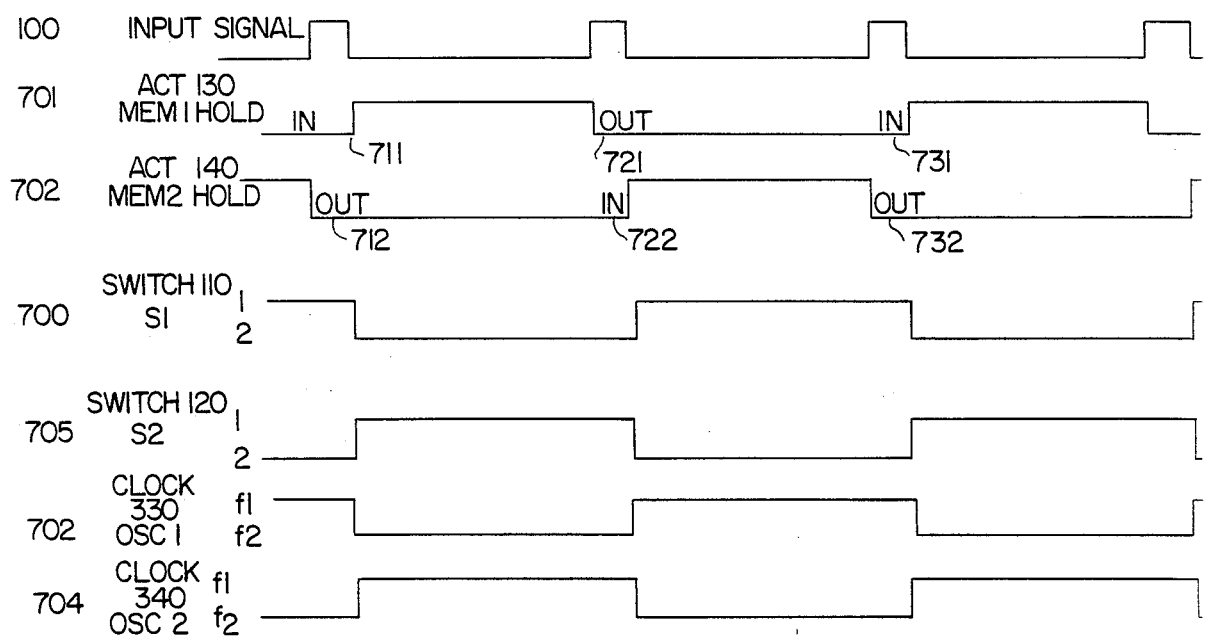

FIG. 1 is a block diagram of the embodiment 10 of the inventive Doppler shift generator. Doppler shift generator 10 can operate in either of two modes. The first mode of operation for Doppler shift generator 10, referred to below as the "chop" mode, is used for providing Doppler shifting of continuous wave (CW) input signals or for systems that must "chop" the receive and transmit functions for the purpose of sharing a single antenna for both the transmit and receive modes. This need to "chop" the receive and transmit functions may also be required for systems which have a receive antenna and a transmission antenna where physical constraints require the receive antenna and the transmission antenna to be located in close proximity to one another, causing poor isolation between receive and transmit signals. The timing control diagrams for the "chop" mode are shown in FIG. 3 as will be explained. The second mode of operation for Doppler shift generator 10, referred to below as the "transmit/receive" (T/R) mode, is used for Doppler shifting as well as for delayed pulsed output signals, for use in situations where simultaneous receive and transmit operation is practical. The timing control diagrams for the T/R mode is shown in FIG. 4 as will be explained.

The following describes the operation of inventive Doppler shift generator 10 in the "chop" mode. RF received signal 100 is applied as input to switch 110. Switch 110 is arranged in a single pole double throw (SPDT) configuration. The SPDT configuration has an input or common terminal for receiving the RF signal (IN) and two output terminals (1 and 2) for selectively coupling to the input terminal. Switch 110 is a high speed PIN diode switch which is well known to those of ordinary skill in the art. Use of PIN diodes for microwave applications is well known. PIN diodes have many characteristics that make them attractive in microwave applications. Such diodes require little power to activate them and have a response time measured in nanoseconds, allow compact circuit design, and like other solid state devices are highly reliable. The development of PIN diodes has been stimulated by the need for fast and economical phase shifters for phased array antennas. Because of the PIN diode, phase shifted antennas can produce single as well as multiple tracking beams without being hindered by mechanical inertia. Thus, the use of PIN diodes in switching applications is well known in the microwave art, and hence switches 110 and 120 can be accommodated by utilization of the PIN diodes. Many examples of such PIN diodes employed in SPDT switch configurations are well known in the art and are utilized particularly for microwave applications. Switch control signal 200 is applied to switch 110. In response to switch control signal 200, switch 110 outputs received input signal 100 as signals 300 and 310, respectively. Switch control signal 200 is generated by means (not shown) in accordance with any one of many methods well known to those of ordinary skill in the art so that switch 110 operates in accordance with timing diagram signal 500 shown FIG. 3 for the "chop" mode and in accordance with timing diagram signal 700 shown in FIG. 4 for the "transmit/receive" mode. The designations 1 and 2 on FIG. 1 and FIGS. 3 and 4 correspond to the output terminal position 1 and 2 of switch 110. Hence in position 1 of switch 110, the input signal is applied to ACT 130 and in position 2 the input signal is applied to ACT 140.

Signals 300 and 310 are applied as input to ACT memory 130 and ACT memory 140, respectively, under the control of memory control signals 201 and 202 which are applied to ACT memory 130 an ACT memory 140, respectively. The control signals are shown in FIG. 3 as signals 501 and 502 for ACT memories 130 and 140 respectively. ACT memories 130 and 140 are identical and are acoustic charge transport (ACT) memories permit operation at slightly differing sampling rates in response to the output of a sampling clock, as is known. As indicated briefly above, the ACT memory as 130 and 140 designated as an acoustic charge transport memory was first demonstrated in the early 1980's by Drs. Michael J. Hoskins and Bill J. Hunsinger at the University of Illinois. Such memories combine dual technology and essentially include a surface acoustic wave (SAW) device which is controlled by a charge couple device (CCD). Thus, the combination of the SAW device and the CCD device provides an analog memory which can sample store and process signals with wide bandwidth and large dynamic range. Such devices are typically constructed in gallium arsenide (GaAs) and hence can be integrated with other circuit functions utilizing microwave monolithic integrated circuit techniques (MMIC). As indicated, the device includes a surface wave transducer which employs interdigital fingers as is well known. The surface wave transducer produces a series of surface disturbances which propagate across the gallium arsenide chip at the velocity of sound. The surface waves induce variations of electric potential below the surface through piezoelectric coupling. The transport occurs in a buried channel formed in an N-type epitaxial layer which has been depleted of charge carriers by for example a Schottky plate which is at the surface of the device. Each charge packet represents a sample of the input signal taken at the SAW frequency which is typically hundreds of mHz or greater. Such devices exhibit sampling apertures of approximately 5 percent of the period of the SAW wave. In this manner the large ratio of SAW potential to electron potential results in a highly efficient transport The charge in each packet may be sensed as it propagates by non-destructive sense electrodes, or it may be removed through a single extraction electrode at the output end of the channel. As indicated, ACT devices are constructed on thin gallium arsenide substrates that are fitted with an active electrical layer at the surface. Such devices include the transport channel which is a channel formed just below the surface of the gallium arsenide substrate and designed to direct the flow of electrons from the source to the drain. This channel controls the properties in the electrical active layer.

The source is an input electrode which is applied to the surface that is capable of injecting electrons into the channel. The number of electrons it injects into the channel is proportional to the signal voltage as for example the RF signal input The drain electrode is an electrode which is applied to the surface that extracts the charge at the end of the channel. All electrons reaching the drain are extracted and provided to a load used to measure the number of electrons as a function of time. The SAW conveying potential is a traveling potential wave which is employed to transport the charge from the source to the drain. This potential is produced by generating an ultrasonic surface acoustic wave which propagates near the surface of the piezoelectric substrate. The wells created by this potential carry millions of electrons. The SAW conveying potential working in conjunction with the source electrode and the transport channel implements a very fast and efficient sampler. This structure samples an incoming signal with an aperture of approximately 0.15 nanoseconds. It samples at the frequency of the SAW beam which is typically 300–700 MHz. Samplers may be operated in parallel to achieve rates well in excess of 1 GHZ.

The most important feature of the device is that the sampling takes place without the need for sampling pulses or analog to digital conversion. The incoming signal basically is sampled by the SAW wave and packets of electrons are formed. The number of electrons is proportional to the signal level at the sampling instant. The packet size can be measured without disturbance with a non-destructive sense output. This is an electrode placed on the surface above the transport channel. Since it does not disturb transport, many such electrodes may be used to make a tapped delay line or a tapped memory. Thus, as indicated, the performance of such ACT memories are well known. The ACT delay line can be converted to analog memory by applying a structure to the surface that has the ability to stop the charge transport on command. Thus, such a device will have a series of electrodes supplied to the surface to perform this function. When these electrodes designated as hold electrodes are grounded, transport proceeds normally and the device acts as a delay line. When a holding voltage is applied, a picket fence of hold potential arises in the channel instantly stopping the charge. The hold voltage is released, transport resumes and a signal emerges from the drain. The device thus becomes a memory capable of storing analog signals without the need for analog to digital conversion.

Thus, ACT memories 130 and 140 are sampled data devices as described above and are known. The ACT memories 30 and 140 are controlled to sample the input signal at or above the Nyquist sampling rate. Memory control signals 201 and 202 are generated by means (not shown) in accordance with any one of many methods well known to those of ordinary skill in the art so that ACT memories 130 and 140 operate in accordance with timing diagram signals 501 and 502, respectively, shown FIG. 3 for the "chop" mode and in accordance with timing diagram signals 701 and 702, respectively, shown in FIG. 4 for the "transmit/receive" mode.

As shown in FIG. 1, received input signal 100 is alternatively applied, in the form of signals 300 and 310, respectively, as input to ACT memories 130 and 140, respectively. ACT memory 130 samples signal 300 in response to the sampling clock provided by a SAW oscillator 330 and ACT memory 140 samples signal 310 in response to the sampling clock provided by a SAW oscillator 340. The SAW oscillators 330 and 340 are controlled in frequency by means of a clock control signal 350. Sampling oscillators 330 and 340 are identical and are variable frequency oscillators which are well known to those of ordinary skill in the art.

ACT memories 130 and 140 process signals 300 and 310 input thereto, respectively, from switch 110 and ACT memories 130 and 140 output signals 360 and 370, respectively, to switch 120. Switch 120 is a high speed PIN switch which is identical to switch 110. Switch 120 operates in response to switch control signal 203 to provide output transmission signal 400. Switch control signal 203 is generated by means (not shown) in accordance with any one of many methods well known to those of ordinary skill in the art so that switch 120 operates in accordance with timing diagram signal 505 shown FIG. 3 for the "chop" mode and in accordance with timing diagram signal 705 shown in FIG. 4 for the "transmit/receive" (T/R) mode.

FIG. 3 shows a timing diagram of various signals which further illustrates the operation of Doppler shift generator 10 in the "chop" mode. First we will explain how data is input to ACT memory 130 by considering the following signals: (1) signal 500 shows how switch 110 applies received input signal 100 alternatively to ACT memory 130 and ACT memory 140 at a fixed and constant "chop" rate which is determined by switch control signal 200; (2) signal 501 shows how ACT memory 130 samples signal 300 applied as input thereto from switch 110 at the "chop" rate; and (3) signal 502 shows how sampling clock 330 drives ACT memory 130. Specifically, as shown at point 600 on signal 500, switch 130 applies signal 110 as input to ACT memory 130 in the form of signal 300 for one-half cycle of the "chop"rate. Further, as shown at point 601 on signal 501, ACT memory 130 samples signal 300 for one-quarter cycle of the "chop" rate and, as shown at point 611 on signal 501, ACT memory 130 "holds" the samples in memory for the next one-quarter cycle of the "chop" rate. Still further, as shown at point 602 on signal 503, ACT 130 has sampled input signal 300 at the frequency $f_1$ in response to the output from sampling clock 330. Yet still further, as shown at point 622 on signal 503, during the time the sampled portion of input signal 300 is "held" in ACT memory 130, sampling clock changes its output frequency to $f_2$, i.e., sampling clock 330 outputs clock signals at frequency $f_1$ for one-half cycle of the "chop" rate and then outputs signals at frequency $f_2$ for the other one-half cycle of the "chop" rate. Next, as shown at point 621 on signal 501, ACT memory 130 outputs the sampled portion of input signal 300 as signal 360 for one-quarter cycle of the "chop" rate. In accordance with point 622 on signal 503, signal 502 is sampled at frequency $f_2$ and output signal 360 is applied as input to switch 120. Then, in accordance with point 605 on signal 505, switch 120 will transmit signal 360 as output signal 400.

By considering the remaining signals shown in FIG. 3, those of ordinary skill in the art will readily appreciate the manner in which signal 506, representing the manner in which inventive Doppler shift generator 10 alternates between receipt of input signal 100 and transmission of output signal 400. Further, because the input signal was clocked into ACT memories 130 and 140 at a frequency of $f_1$ and the output signal was clocked out of ACT memories 130 and 140 at a frequency of $f_2$, Doppler frequency shift equal to the difference in clock frequencies $f_2 - f_1$ has been introduced into the output signal.

Note the following important characteristics of Doppler shift generator 10. The oscillators 330 and 340 can be conventional frequency synthesizers and can include numerical control means. Preferably, the sampling clocks 330 and 340 are highly stable numerically controlled modulated oscillators (NCMO) which are well known to those of ordinary skill in the art. While NCMO oscillators can be employed, it is understood that oscillators 330 and 340 can be conventional frequency synthesizers. These can be incorporated in a synthesizer using direct frequency synthesis to provide a highly accurate frequency transition between $f_1$ and $f_2$. For an example of a numerically controlled modulated oscillator, reference is made to an article entitled "Direct Digital Synthesis and the Numerically Controlled Modulated Oscillator" by Earl W. McCune of Digital RF Solutions, Santa Cruz, Calif. 95054, published as an application article by the above-noted company. It is important sampling clocks 330 and 340 be highly stable so that they maintain full signal coherence and have tuning characteristics that do not introduce the phase jumps typical of ordinary synthesizers. In fact, accurate relative frequency and phase between sampling clocks 330 and 340 is achieved by phase locking each sampling clock to a common reference oscillator (not shown) by means of leads 350. The locking of an oscillator by means of a phase locked loop or to a stable crystal oscillator is well known. The clocks 330 and 340 can be controlled by means (not shown) over leads 350 in accordance with any one of many methods well known to those of ordinary skill in the art so that clocks 330 and 340 operate in accordance with timing diagram signals 503 and 504, respectively, shown FIG. 3 for the "chop" mode and in accordance with timing diagram signals 702 and 704, respectively, shown in FIG. 4 for the "transmit/receive" mode.

Note that before the signal stored in ACT memories 130 and 140 can be output therefrom after the sampling clock frequency is changed from $f_1$ to $f_2$, a delay time equal to the ACT memory delay time must occur. This is because a delay time equal to the ACT memory delay time is required for the sampling clock acoustic wave to travel the length of the memories. As a result, sampling operations in ACT memories 130 and 140 are performed in parallel memories in accordance with methods well known to those of ordinary skill in the art to eliminate the "hole" that would normally occur in the output signal while waiting for the change in sampling clock to occur with the ACT memory.

FIG. 4 shows a timing diagram of various signals which illustrate the operation of inventive Doppler shift generator 10 in the simultaneous "transmit/receive" mode. As shown in FIG. 4, signal 700 illustrates how switch 110 applies input signal 100 alternatively as signals 300 and 310 to ACT memories 130 and 140, respectively, at a predetermined rate and how switch 120 alternatively applies outputs 360 and 370 from ACT memories 130 and 340, respectively, at the same rate to form output signal 400. Further, as is shown in FIG. 4, switch 110 connects the input to ACT memory 130 at the same time that switch 120 connects ACT memory 140 to the output and vice versa. Further, sampling clocks 330 and 340 also alternate between frequencies $f_1$ and $f_2$ at the same rate that switches 110 and 12 alternate between ACT memories 130 and 140, respectively. Lastly, (1) as shown by points 711 and 731 of signal 701 in FIG. 4, input signal 100 is received by ACT memory 130 at the sampling rate set by clock 330 of frequency $f_1$; (2) as shown by point 721 of signal 701 in FIG. 4, the samples representing input signal 100 are held in ACT memory 130 and then output from ACT memory 130 at the sampling rate set by clock 330 of frequency $f_2$; (3) as shown by points 712 and 732 of signal 702 in FIG. 4, the samples representing input signal 100 are output from ACT memory 140 at the sampling rate set by clock 340 of frequency $f_2$; and (4) as shown by point 722 of signal 702 in FIG. 4, input signal 100 is received by ACT memory 140 at the sampling rate set by clock 340 of frequency $f_1$. As should be clear to those of ordinary skill in the prior art, the delay between receiving the input signal and retransmitting the stored signal is variable and is controlled by the means (not shown) which generates control signals 201 and 202, respectively, by keeping ACT memories 130 and 140, respectively, in the hold state for a predetermined length of time. As a consequence of this, the transmitted signal may occur at any time, including the time during which a signal is being received. However, this mode of operation requires means for predicting the occurrence of pulses in input signal 100 to provide the required timing signal synchronization. Such apparatus are well known to those of ordinary skill in the art as PRI tracking apparatus and includes the use of digital signal processing apparatus.

Figure 2:
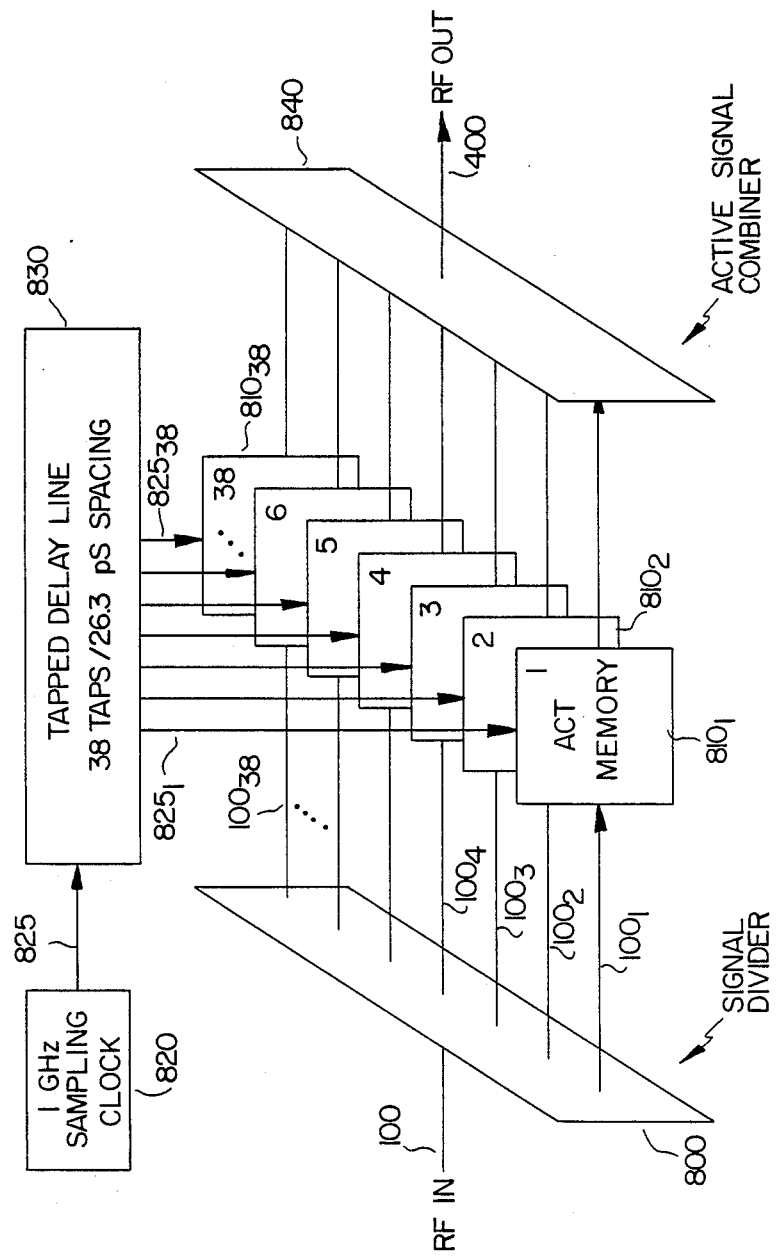
FIG. 2, shows a block diagram of an apparatus which utilizes multiphase sampling to extend the bandwidth of the ACT memory.

As is well known to those of ordinary skill in the art, ACT memories are physically limited to operating at frequencies which are less than 1 GHz. As a result, since the sampling rate must satisfy the Nyquist sampling criterion, the maximum input frequency which can be handled by a single ACT memory device is limited to be less than 0.5 GHz. However, this limited sampling rate can be effectively increased by using a multiple phase sampling apparatus such a that shown in FIG. 2 to extend the bandwidth of analog memory means used to fabricate the inventive Doppler shift generator 10 which includes the ACT memory devices. For example, as shown in FIG. 2, a basic GHz sampling clock is divided into 38 phases to provide an effective 18 GHz RF input upper frequency limit, plus some headroom, in accordance with the Nyquist sampling criterion, i.e., each of the 38 ACT memories operates with a 1 GHz sampling rate which is limited by the acoustic wave phenomenon. Specifically, as shown in FIG. 2, RF input signal 100 is applied to signal divider 800 which divides the signal into 38 parts $100_1$ to $100_{38}$. Signal dividers for performing this task are well known to those of ordinary skill in the art. Signals $100_1$ to $100_{38}$ are applied as inputs ACT memories $810_1$ to $810_{38}$, respectively. Sampling clock 820 outputs a 1 GHz signal 825 which is applied as input to tapped delay line 830. Sampling clocks for providing a 1 GHz output clock are well known to those of ordinary skill in the art. Further, tapped delay line 830 provides 38 outputs, outputs $835_1$ to $835_{38}$, having a 26.3 pS spacing therebetween. Tapped delay lines for providing such outputs are well known to those of ordinary skill in the art. Delayed outputs $835_1$ to $835_{38}$ are applied to ACT memories $810_1$ to $810_{38}$, respectively, which, in response thereto, sample portions of input signal 100. Lastly, when the stored samples in ACT memories $810_1$ to $810_{38}$ are to be output as transmitted signal 400, the outputs are combined in active signal combiner 840. Active signal combiners for providing such outputs are well known to those of ordinary skill in the art.

Figure 5:
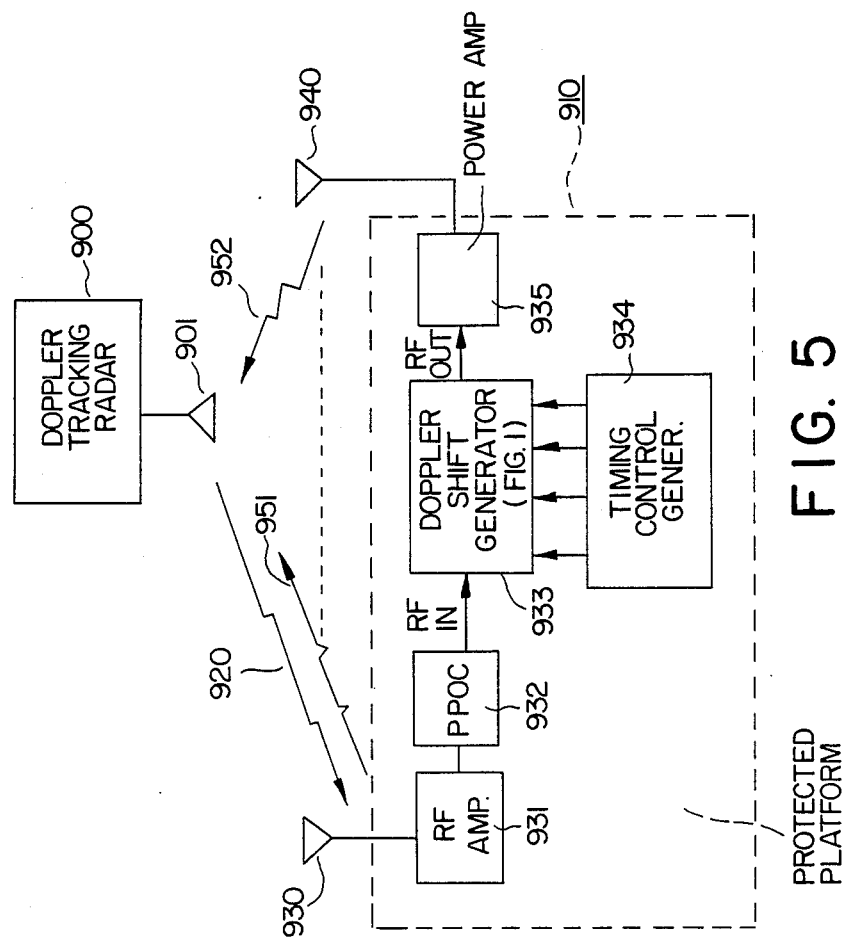
FIG. 5 is a simple block diagram of the Doppler shift generator employed in a countermeasure application.

Referring to FIG. 5, there is shown a very simple block diagram indicating the use of the Doppler shift generator apparatus as above described. As seen, there is shown a Doppler tracking radar system 900 which has a transmit/receive antenna 901. Although antenna 901 is shown as a single antenna, separate transmit and receive antennas can be employed. The Doppler tracking radar system 900 may conventionally be employed on an aircraft or other vehicle utilized for military purposes. There is shown an additional protected platform designated by reference numeral 910. The protected platform 910 may in a similar manner be an aircraft or other military vehicle. As one can ascertain, the Doppler tracking radar 900 transmits at a fixed frequency a signal 920 which is the RF transmitted radar signal. This signal is received by the antenna 930 located on a protected platform 910. The received signal is directed through an RF amplifier 931 to conventional processing circuit 932 where it is applied to the Doppler shift generator 933 as the generator shown in FIG. 1. The Doppler shift generator is controlled by a timing control generator 934. The timing control generator is in fact a suitable timing control network which operates to provide the waveform shown in FIG. 3 and FIG. 4.

As one can ascertain, the waveforms shown in FIG. 3 and FIG. 4 can be provided by many conventional techniques including stable oscillators operating with digital dividers and gates to produce the waveforms exactly as shown in FIGS. 3 and 4. It is apparent that one skilled in the art would have no difficulty in implementing the timing control generator 934 to operate and provide the waveforms shown in FIGS. 3 and 4 for example.

As indicated, the input to the Doppler shift generator of FIG. 1 from the processing module 932 is the RF received signal IN. The Doppler shift generator operates to direct the signals to the ACT memories as indicated and described above produces a RF signal for the power amplifier 935 which RF signal is then transmitted back to the Doppler tracking radar unit 900 via the transmitting antenna 940. This retransmitted signal is suitable in amplitude to completely cover the actual reflected signal which would emanate from signal 920 impinging upon the platform 910. This reflected signal 951 is smaller in magnitude then the transmitted signal 952 and hence the transmitted signal 952 completely covers the actual reflected signal 951. In this manner, the Doppler tracking radar 900 receives actual false information based on the receive signal 952 which false information has an arbitrary Doppler shift as generated by the Doppler shift generator 933 to thereby prevent the Doppler tracking radar 900 from tracking the protected platform 910.

As should be clear to those of ordinary skill in the art, further embodiments of the present invention may be made without departing from its teachings and all such embodiments are considered to be within the spirit of the present invention. Therefore, it is intended that all matter contained in the above description or shown in the accompanying drawings shall be interpreted as illustrative and not limiting.

What is claimed is:

1. A doppler shift generator apparatus for providing a predetermined Doppler shift to an incoming received RF signal as generated by a Doppler tracking radar to provide an output RF signal for transmission having said Doppler shift with said output signal providing false information to a tracking radar, comprising:

first and second analog memories, each having an input for receiving analog data at a first rate to be stored in said memories and an output for outputting the stored analog data, clock control means coupled to said first and second analog memories for controlling the outputting of stored analog data therefrom at a second rate different from the first rate, first switching means responsive to said received RF signal coupled to said inputs of said first and second memories and operative to select either said input of said first or second memory for applying said RF signal thereto, second switching means coupled to said outputs of said first and second memories and operative to apply either output of said first or second memory to an output terminal indicative of said output RF signal, and control means coupled to said first and second switching means and operative in conjunction with said first and second analog memories and said clock control means for selectively applying said received RF signal to said first and second memories to store said signal in said first and second memories at the first rate and for outputting said stored signals at the second rate to provide said output RF signal with a Doppler shift relatively equal to the difference between said first and second rates.

2. The Doppler shift generator apparatus according to claim 1, wherein said first and second analog memories are acoustic change transport (ACT) memories.

3. The Doppler shift generator apparatus according to claim 1, wherein said control means includes first and second switch control means coupled to said first and second switching means and operative to apply said received RF signal to said first memory when said second memory is outputting said stored signal and to apply to said received RF signal to said second memory when said first memory is outputting said stored signal.

4. The Doppler shift generator apparatus according to claim 3, wherein said clock control means further includes first and second oscillators each for providing a first and second frequency with said first oscillator coupled to said first memory and said second oscillator coupled to said second memory and operative to clock data into said memories at said first frequency rate and to output said stored data at said second frequency rate whereby the difference between said first frequency and said second frequency is equal to a Doppler frequency indicative of said Doppler shift.

5. The Doppler shift generator apparatus according to claim 4, wherein said first and second oscillators are highly accurate, variable frequency oscillators.

6. The Doppler shift generator apparatus according to claim 1, wherein said control means further includes memory control means coupled to said first and second memories to cause said first memory to store data received while said second memory receives data to be stored and vice versa whereby only one of said memories is receiving data when said other memory is storing data.

7. The Doppler shift generator apparatus according to claim 1, wherein each of said first and second memories includes a plurality of separate memory devices, each of which is sequentially sampled to receive said RF input and to output said stored data as sequentially sampled, to thereby enable each of said first and second memories to operate to receive and store sampled RF data according to the Nyquist criteria.

8. The Doppler shift generator apparatus according to claim 1, wherein said first and second switching means are PIN diode switches.

9. The Doppler shift generator apparatus according to claim 1, including means for applying said output RF signal to a transmitting antenna means.

10. The Doppler shift generator apparatus according to claim 1, wherein said received RF signal is received by means of a receiving antenna means.

11. A Doppler shift generator which comprises:
control means for generating: (1) first and second memory control signals which are applied as input to first and second analog memory devices, respectively; (2) first and second clock control signals which are applied as input to first and second clock means, respectively, and (3) first and second switch control signals which are applied as input to first and second switch means, respectively;

wherein: (1) the first switch means, in response to the first switch control signal, alternatively applies an input signal to the first and second analog memory devices; (2) the first clock means, in response to the first clock control signal, outputs a first clock signal having a first frequency and a second frequency which is applied to the first analog memory device; (3) the second clock means, in response to the second clock control signal, outputs a second clock signal having a first frequency and a second frequency which is applied to the second analog memory device; (4) the first analog memory means, in response to the input signal, the first clock signal, and the first analog memory control signal, samples the input at the first frequency, stores the samples for a time, and outputs the samples at the second frequency as a first signal to the second switch means; (5) the second analog memory means, in response to the input signal, the second clock signal, and the second analog memory control signal, samples the input at the first frequency, stores the samples for the time, and outputs the samples at the second frequency as a second signal to the second switch means; and the second switch means, responsive to the first and second signals and the second switch control signal, alternatively outputs the first and second signals as a Doppler shifted output signal.

12. The Doppler shift generator of claim 1 wherein the first and second analog memory devices are comprised of acoustic charge transport (ACT) memory devices.

13. The Doppler shift generator of claim 2 which further includes means for sampling various phase portions of the input signal.

14. The Doppler shift generator according to claim 11, wherein said first and second clock means are highly accurate, variable frequency oscillators.

15. The Doppler shift generator according to claim 1, wherein said input signal is a received RF signal emanating from a Doppler tracking radar.

16. The Doppler shift generator according to claim 11, further including transmitting means coupled to said second switch means for transmitting said Doppler shifted output signal.

17. The Doppler shift generator according to claim 11, wherein said first and second clock means are numerically controlled oscillators.

18. The Doppler shift generator according to claim 15, wherein said received RF signal is from a continuous wave Doppler tracking radar.

19. The Doppler shift generator according to claim 15, wherein said received RF signal is for a pulsed Doppler tracking radar.

20. The Doppler shift generator according to claim 11, wherein said first and second switch means are PIN diode switches.

* * * * *